United States Patent

Richards

(10) Patent No.: US 6,935,189 B2
(45) Date of Patent: Aug. 30, 2005

(54) MULTIPHASE FLOW METER USING MULTIPLE PRESSURE DIFFERENTIALS

(75) Inventor: Andrew Richards, Aberdeenshire (GB)

(73) Assignee: Expro North Sea Limited, Aberdeen (GB)

( * ) Notice: Subject to any disclaimer, the term of this patent is extended or adjusted under 35 U.S.C. 154(b) by 0 days.

(21) Appl. No.: 10/433,111

(22) PCT Filed: Nov. 28, 2001

(86) PCT No.: PCT/GB01/05236

§ 371 (c)(1),
(2), (4) Date: Jun. 20, 2003

(87) PCT Pub. No.: WO02/44664

PCT Pub. Date: Jun. 6, 2002

(65) Prior Publication Data

US 2004/0182172 A1 Sep. 23, 2004

(30) Foreign Application Priority Data

Nov. 29, 2000 (GB) ............................................. 0029055

(51) Int. Cl.⁷ ................................................. G01F 1/74
(52) U.S. Cl. ................................................. 73/861.04
(58) Field of Search .................. 73/861.04, 861.42, 73/861.66, 861.72, 861.08, 861.63

(56) References Cited

U.S. PATENT DOCUMENTS

| | | | | |
|---|---|---|---|---|
| 4,576,043 A | * | 3/1986 | Nguyen ........................ | 73/195 |
| 5,036,710 A | * | 8/1991 | King ........................ | 73/861.04 |
| 5,099,697 A | * | 3/1992 | Agar ........................ | 73/861.04 |
| 5,291,791 A | * | 3/1994 | Lucas et al. ............. | 73/861.08 |
| 5,551,305 A | | 9/1996 | Farchi et al. ............ | 73/861.04 |
| 5,591,922 A | * | 1/1997 | Segeral et al. ........... | 73/861.04 |
| 5,597,961 A | * | 1/1997 | Marrelli .................... | 73/861.04 |
| 5,608,170 A | * | 3/1997 | Atkinson et al. ......... | 73/861.04 |
| 5,736,650 A | * | 4/1998 | Hiron et al. ............. | 73/861.63 |
| 5,740,977 A | * | 4/1998 | Kaya ........................ | 242/348.3 |
| 6,502,467 B1 | * | 1/2003 | Fincke .................... | 73/861.63 |

FOREIGN PATENT DOCUMENTS

| | | |
|---|---|---|
| EP | 0684 458 | 11/1995 |
| GB | 2 263 172 | 7/1993 |
| WO | 95 02165 | 1/1995 |
| WO | 00 14484 | 3/2000 |

\* cited by examiner

*Primary Examiner*—Edward Lefkowitz
*Assistant Examiner*—Jewel V. Thompson
(74) *Attorney, Agent, or Firm*—Gifford, Krass, Groh, Sprinkle, Anderson & Citkowski, P.C

(57) ABSTRACT

A flowmeter, and a method of, measuring the flow of a multi-phase fluid is described. The flowmeter has a first pressure sensor located in a conduit for measuring a first pressure differential at a first location and a second response sensor spaced along the conduit for measuring a second pressure differential at a second location. The flowmeter includes pressure drop creation means for causing a drop in fluid pressure between the first and second locations, and a water fraction meter upstream of the first location or downstream of the second location for measuring the fraction of water in the multi-phase fluid. Various embodiments of the invention are described and in a preferred arrangement the first and second pressure measuring means are venturi flowmeters.

14 Claims, 1 Drawing Sheet

MULTIPHASE FLOW METER USING MULTIPLE PRESSURE DIFFERENTIALS

FIELD OF THE INVENTION

The present invention relates to apparatus for, and a method of, measuring the flow of a multi-phase fluid. The invention is particularly, but not exclusively, suitable for measuring the flow of multi-phase fluids produced from oil and gas wells.

BACKGROUND OF THE INVENTION

Multi-phase metering systems are widely used in the oil and gas and petrochemical industries. In the oil and gas industry it is necessary to measure the flow rates of oil, gas and water, all of which are produced from the sub-surface reservoir to surface via "production wells" drilled in the earth.

There are a number of current systems available to do this but few, if any, of them are either compact enough, or can be constructed "in-line", to allow them to be used within the well bore, as well as at the surface.

It is known that two-phase hydrocarbon/water flow metering is achieved by the use of a volume fraction determining device in addition to a venturi. The fraction measurement device for hydrocarbon/water usually, but not always, takes advantage of differing electro-magnetic properties of the two phases to determine the volumetric phase fractions. Existing downhole water fraction meters allow the metering of the two-phase fractions (oil-water or gas-water) over the whole of the water fraction range from 0 to 1—for example, roxar MF1 water cut meter (Roxar, Norway), Fluenta MPFM 1900 (Fluenta, Norway). It is also known that it is possible to measure the gas fraction, otherwise known as the void fraction, by the use of radio-active density measurement devices.

By using the above two techniques along with flow velocity measurements derived from the cross-correlation of data from sensors spatially separated along the flow paths, it is possible to construct a system which will measure three-phase flow.

However, the use of radio-active sources has two principal disadvantages. Firstly, the sources require careful and substantial packaging to mitigate the health and safety implications of using such sources and, secondly, the use of such sources currently installed in oil and gas wells is still not an accepted practice throughout the oil and gas industry.

An object of the present invention is to provide an improved apparatus and method for measuring the flow and multi-phase fluids, particularly from production wells.

SUMMARY OF THE INVENTION

The present invention solves the problems associated with such radio-active sources by eliminating the need for such sources to measure the gas fraction, by taking advantage of the high compressibility of the gas phase, as disclosed in U.S. Pat. No. 4,168,624.

According to a first aspect of the present invention there is provided a multi-phase flowmeter for measuring the flow of a multi-phase fluid flowing through a conduit, said flowmeter comprising:

a first pressure measuring means disposed in said conduit at a first location for measuring a first pressure differential at said first location;

a second pressure measuring means disposed in said conduit at a second location spaced along said conduit from said first pressure measuring means for measuring a second pressure differential at said second location;

pressure drop creation means for creating a measurable pressure drop, in use, between said first and second locations, and a water fraction measuring means for measuring the fraction of water in said multi-phase fluid, said water fraction meter being locatable upstream of said first location or downstream of said second location.

Preferably, said first and said second pressure measuring means are venturi flowmeters. Alternatively, said first and said second pressure measuring means are chokes with at least two absolute pressure transducers for measuring the differential pressure across the choke or each choke has a differential pressure measurement device.

Preferably said pressure drop creation means is a third venturi disposed in said conduit at a third location between said first location and said second location. Preferably also the second and third venturis are combined in a double venturi.

Alternatively, said pressure drop creation means is a choke.

In a further alternative arrangement the pressure drop creation means is a length of conduit providing a frictional pressure drop or if the conduit is inclined to the horizontal an additional pressure drop due to the gravity head.

Preferably said water fraction measuring means has a capacitance sensor for calculating a water fraction of an oil-continuous fluid flowing in said conduit and a conductance sensor for calculating the conductivity of a water-continuous fluid flowing in said conduit.

Alternatively said water fraction measuring means includes a microwave generator and detector for detecting the water fraction of fluid flowing in said conduit.

Preferably, the first and second venturi, the pressure drop creation means and the water fraction measuring means are disposed in a single tubular member.

Alternatively the first and the second venturi, the pressure drop creation means and the water fraction measuring means are disposed over a plurality of tubular members.

According to a further aspect of the present invention there is provided a method of measuring the flow rate of components of a multi-phase fluid flowing in a conduit, said method comprising the steps of:

measuring a first pressure differential in said conduit at a first location;

measuring a second pressure differential in said conduit at a second location spaced from the first location;

creating a pressure drop in said multi-phase fluid between said first and said second locations and measuring the pressure drop;

measuring the fraction of water in said multi-phase fluid upstream of said first location or downstream of said second location, and processing the first and second pressure differentials, the pressure drop and the water fraction measurements to provide a mass flow rate and a volume flow rate for each component of said multi-fluid at the flowing temperature and pressure.

Preferably, the method includes the step of measuring the water fraction upstream of the first location.

BRIEF DESCRIPTION OF THE DRAWINGS

These and other aspects of the invention will become apparent from the following description, when taken in combination with the accompanying drawings, in which.

DETAILED DESCRIPTION OF THE PREFERRED EMBODIMENTS

Figure 1:
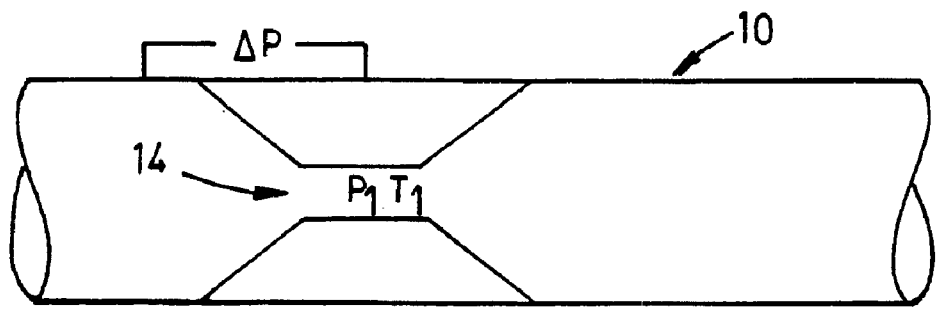
FIG. 1 is a diagrammatic view of a standard venturi meter for measuring the total mass flow rate in a conduit.

Reference is now made to FIG. 1 of the drawings which depicts a standard venturi meter 10 which measures the total mass flow rate in a conduit 12 by measuring the pressure drop $\Delta P$ caused by the restriction throat 14. When the fluid fractions are known, along with the densities of the fluids, at the in situ fluid flow pressure and temperature $P_1$, $T_1$, then both the individual phase mass flow rates and the individual volumetric flow rates can be determined, as is well known in the art and as is disclosed in Flow Measurement Engineering Handbook, Miller, R. W. McGraw-Hill 1996; Venturi Meters in Multi-Phase Flow, National Engineering Laboratory (UK), Report No. 286/99, 1999.

Figure 2:
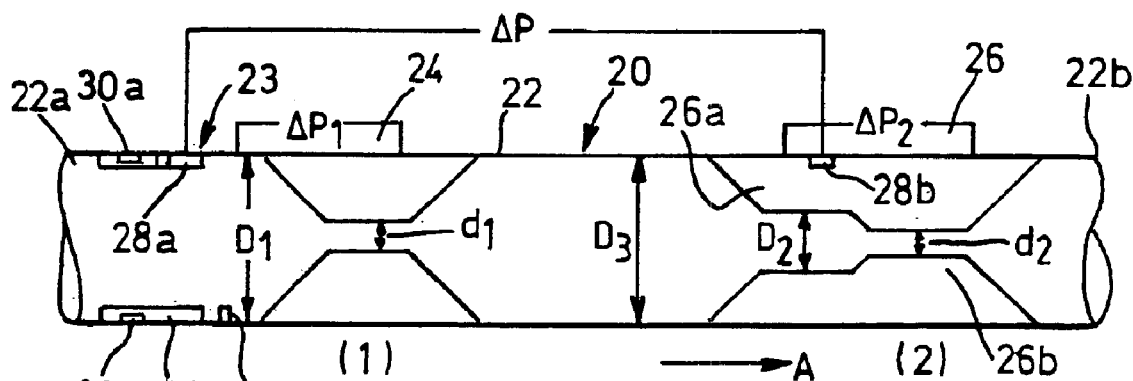
FIG. 2 is a diagrammatic view of a multi-phase flowmeter in accordance with a first embodiment of the present invention.

Reference is now made to the embodiment shown in FIG. 2 of the drawings which depicts a multi-phase flowmeter in accordance with the first and preferred embodiment of the present invention. It will be seen that the multi-phase flowmeter, generally indicated by reference numeral 20, is disposed in a single conduit 22 along which well fluid flows in the direction of arrow A. Conduit end 22a is the upstream end and 22b is the downstream end.

The multi-phase flowmeter 20 consists of a water fraction meter 23, a first venturi 24 disposed at a first location downstream of the water fraction meter, and a second venturi 26 spaced along the conduit 22 from venturi 24. The second venturi 26 is a double venturi. A first venturi portion 26a is used to generate a pressure loss and a second venturi portion 26b with a narrower throat is used to measure a pressure differential for use in multi-phase flow calculations, as will be later described. Disposing these components in a single conduit 20 provides a compact flowmeter structure without any moving parts.

In the flowmeter shown in FIG. 2, the diameter of the conduit 20 is known and the venturi 24 has a first throat restriction $d_1$ so that a pressure differential $\Delta P_1$ is measured at venturi 24. Similarly, at venturi 26 pressure differential $\Delta P_2$ is measured between the throat restriction D2 of venturi 26a and the throat $d_2$ of venturi 26b. In addition, a pressure differential $\Delta P$ is measured across venturi 26a, between the diameter $D_1$ and diameter $D_2$ of venturi 26a. In addition, the absolute pressure and temperature of the fluid is measured upstream of venturi 24 at location 27.

The following fluid parameters are defined for use in the following equations at venturi 24 (location 1) and venturi 26 (location 2):

$M_1$=Total mass/s at (1)
$M_2$=Total mass/s at (2)
$M_{O1}$=mass/s oil at (1)
$M_{O2}$=mass/s oil at (2)
$M_{G1}$=mass/s gas at (1)
$M_{G2}$=mass/s gas at (2)
$M_{W1}$=mass/s water at (1)
$M_{W2}$=mass/s water at (2)
$\rho_{O1}$=density of oil at (1)
$\rho_{O2}$=density of oil at (2)
$\rho_{G1}$=density of gas at (1)
$\rho_{G2}$=density of gas at (2)
$\rho_{W1}$=density of water at (1)
$\rho_{W2}$=density of water at (2)
$V_{O1}$=volume/s of oil at (1)
$V_{O2}$=volume/s of oil at (2)
$V_{W1}$=volume/s of water at (1)
$V_{W2}$=volume/s of water at (2)
$V_{G1}$=volume/s of gas at (1)
$V_{G2}$=volume/s of gas at (2)
$P_1T_1$ is the pressure, temperature upstream of venturi 24.
$P_2T_2$ is the pressure, temperature upstream of venturi 26b.
$\Delta P$ is the pressure differential between the upstream tappings of venturis 24, 26b.
$\Delta P_1$ is the pressure loss across venturi 24.
$\Delta P_2$ is the pressure loss across venturi 26b.

$$\beta_1 = \frac{d_1}{D_1} \quad \beta_2 = \frac{d_2}{D_2}$$

Mass/second at point (1)=Mass/second at point (2)=

$$M_1 = \frac{C_1 C_{D1} d_1^2}{\sqrt{1-\beta_1^4}} \sqrt{\rho_1 \Delta P_1} \quad M_2 = \frac{C_1 C_{D2} d_2^2}{\sqrt{1-\beta_2^4}} \sqrt{\rho_2 \Delta P_2}$$

By conservation of mass:

$$M_1 = M_2 \text{ (mass/second)}$$

$$\frac{C_1 C_{D1} d_1^2}{\sqrt{1-\beta_1^4}} \sqrt{\rho_1 DP_1} = \frac{C_1 C_{D2} d_2^2}{\sqrt{1-\beta_2^4}} \sqrt{\rho_2 DP_2}$$

$C_1$ is a constant and assuming the gas volume has a relatively small change from point (1) to point (2) the $$C_1 C_{D1} = C_1 C_{DC}$$

so $$\frac{d_1^4}{(1-\beta_1^4)} \rho_1 \Delta P_1 = \frac{d_2^4}{(1-\beta_2^4)} \rho_2 \Delta P_2$$

$$\frac{d_1^4}{(1-\beta_1^4)} = \delta_1 \text{ and } \frac{d_2^4}{(1-\beta_2^4)} = \delta_2$$

are both known and are functions of the geometry of the two venturis at locations (1) and (2). Then:

$$\delta_1 \rho_2 \Delta P_1 = \delta_2 \rho_2 \Delta P_2 \quad (1)$$
$$\frac{\rho_1}{\rho_2} = \frac{\delta_2 \Delta P_2}{\delta_1 \Delta P_1}$$

-continued $$M_1 = M_{O1} + M_{WI} + M_{GI} \quad M_2 = M_{O2} + M_{W2} + M_{G2} \quad (1a)$$
$$V_1 = V_{O1} + V_{WI} + V_{GI} \quad V_2 = V_{O2} + V_{W2} + V_{G2}$$
$$\rho = \frac{M}{V}$$

Substituting (1a) in (1) produces $$\frac{V_2}{V_1} = \frac{\delta_2 \Delta P_2}{\delta_1 \Delta P_1} \quad (2)$$

$V_2$ and $V_1$ are both unknown. However, $V_2$ can be expressed as a function of $V_1$ provided that the pressure volume and temperature relationships (PVT) of the gas and oil are known. The water is assumed to remain unchanged from location 1 to location 2.

So $V_{O2} = V_{O1} - [(\zeta)_{DP} * V_{O1}]$ (3)

where $(\zeta)_{DP}$ is the volumetric shrinkage co-efficient of the oil as the gas from the oil is liberated from the high pressure point (1) to the low pressure point (2). and $$V_{q2} = [V_{q1} * C_q \times \Delta P] + [\Delta R_s * V_{O1}] \quad (4)$$

$\Delta_{rs}$ is the volume of gas liberated per unit of volume of oil at $P_1 T_1$ over the pressure $\Delta P$
where: $V_{q1} * C_q * \Delta P$ is the volumetric expansion from point 1 to point 2 and
$\Delta R_s * V_{O1} * E_q$ is the volume of gas liberated from the oil as the pressure declines from point (1) to point (2)
so substituting (3) and (4) into (2) and expanding gives $$\frac{\delta_2 \Delta P_2}{\delta_1 \Delta P_1} = \left\{ 1 - \frac{V_{WI}}{V_1} - \frac{V_{qI}}{V_1} \right\} \{1 - (\zeta)_{DP} + \Delta R_S\} + \frac{V_{qI}}{V_1} * C_q * \Delta P + \frac{V_{WI}}{V_1} \quad (5)$$

$\Delta P$, $\Delta P_2$ and $\Delta P_1$ are measured by the venturis 24, 26 and absolute pressure sensors 28a, 28b. $\xi$, $R_S$, $C_g$ and $E_q$ are derived from the chemical composition via equation of state calculations, or are measured using representative oil and gas samples.

This leaves the unknown quantities—

| | |
|---|---|
| $\frac{V_{WI}}{V_1}$ | the water volume fractions at location (1) |
| $\frac{V_{qI}}{V}$ | the gas volume fractions at location (1) |
| $\frac{V_{WI}}{V_1}$ | is effectively measured by water fraction meter 23 placed in line with the dual venturi mechanism. |

It will be understood that the calculation of water fraction requires two sensors 30a, 30b. One sensor 30a measures the effective permittivity when the oil or gas forms a continuous phase, that is the bulk of the fluid mixture is insulating. A second sensor 30b measures the effective resistivity when the water forms a continuous phase and the mixture is conducting.

Firstly considering the use of the multi-phase flowmeter when receiving a continuous hydrocarbon which is electrically insulating, it will be understood that oil and gas have similar relative permittivities ($\epsilon_R$) which differ greatly from the permittivity of saline water produced by the well. Typical values are:
  $\epsilon_R$ gas~1.7–2.0
  $\epsilon_R$ oil~2.5
  $\epsilon_R$ water~100

The calculations down to equation 5 are then made and in the first iteration the water volume fraction is calculated from the water fraction meter using the capacitance sensor. Assuming no gas is present, then the permittivity of the hydrocarbon is equal to the permittivity of the oil. The gas volume fraction, for example—

$$\frac{V_{gI}}{V_1}$$

is then calculated from equation 5 using this first value of the water volume fraction $$\frac{V_{WI}}{V_1}$$

assuming $\epsilon_R = \epsilon_R$ oil for the first iteration.

The volume fractions of the water and gas fractions are estimated, allowing $$\frac{V_{O1}}{V_1}$$

the oil volume fractions to be calculated.

Once this is done, the effective relative permittivity of the hydrocarbon component is recalculated allowing for the fact that it is not 100% oil—

$\epsilon_R$ hydrocarbon (iteration 2)=

$$\frac{\frac{V_{O1}}{V_1} * \epsilon_R \text{ oil} + \frac{V_{gI}}{V_1} * \epsilon_R \text{ gas}}{\left(1 - \frac{V_{WI}}{V}\right)}$$

This new value of $\epsilon_R$ hydrocarbon is inserted into the calculation of water volume fraction, allowing a second set of volume fractions to be calculated. This iteration process is repeated until a satisfactory result is obtained the result of iteration n differs from the result of iteration n–1 by less than 0.5%.

In the situation when the multi-phase fluid flowing through the conduit is water continuous, that is it is conducting there is no need to iterate this calculation and the value of $$\frac{V_{WI}}{V_1}$$

is obtained from the water fraction meter and can be directly applied to equation 5 to give the gas volume fraction; hence the oil volume fraction can be calculated.

Because the three-phase volume fractions at location 1a are known, and the phase densities at the pressure volume and temperature measurements are known from PVT, then the total flowing fluid density of known. The following standard venturi equations are then used to calculate the total mass through the venturi located at location 1 as is well known by a person skilled in the art. This allows the calculation of the mass and volume flow rates at the in situ pressure and temperature values $P_1$ and $T_1$ as follows:

At location 1, the density of fluid is given by: ρfluid, $$1 = \frac{V_{WI}}{V_1} * \rho_{WI} + \frac{V_{01}}{V_1}\rho_{01} + \frac{V_{GI}}{V_1}\rho_{GI}$$

and total volume flowing at location 1 is given by:

$$q_{VI} \text{ (Total)} = \frac{C_1 C_{DI} d_1^2 \sqrt{\rho\text{fluid, }1 * \Delta P_1}}{\sqrt{1-\beta_1^4}}{\rho\text{fluid, }1}$$

the discharge coefficient $C_D$ in multi-phase flow can be derived from the National Engineering Laboratory Report referred to above. Therefore, the volumetric flow rates for water, oil and gas are:

$$V_{WI} = qV_1 \text{ (Total)} * \frac{V_{WI}}{V_1}$$

$$V_{01} = qV_1 \text{ (Total)} * \frac{V_{01}}{V_1}$$

$$V_{GI} = qV_1 \text{ (Total)} * \frac{V_{GI}}{V_1}$$

Figure 3:
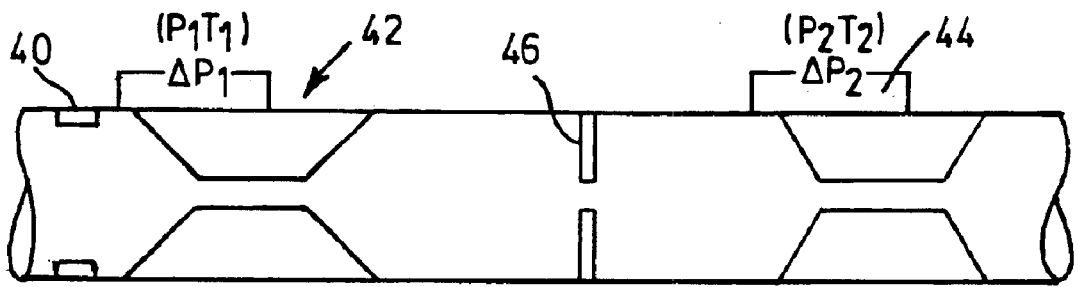
FIG. 3 is a diagrammatic view of a flowmeter in accordance with a second embodiment of the present invention.

Reference is now made to FIG. 3 of the drawings which depicts a multi-flowmeter in accordance with an alternative embodiment of the invention. In this embodiment the flowmeter comprises a water fraction meter 40 upstream of a first venturi 42. A second downstream venturi 44 spaced from the first venturi and between the venturis 42,44 is a pressure drop device or choke 46. The same calculations applied to the first embodiment can be similarly applied here to provide the same output results.

Figure 4:
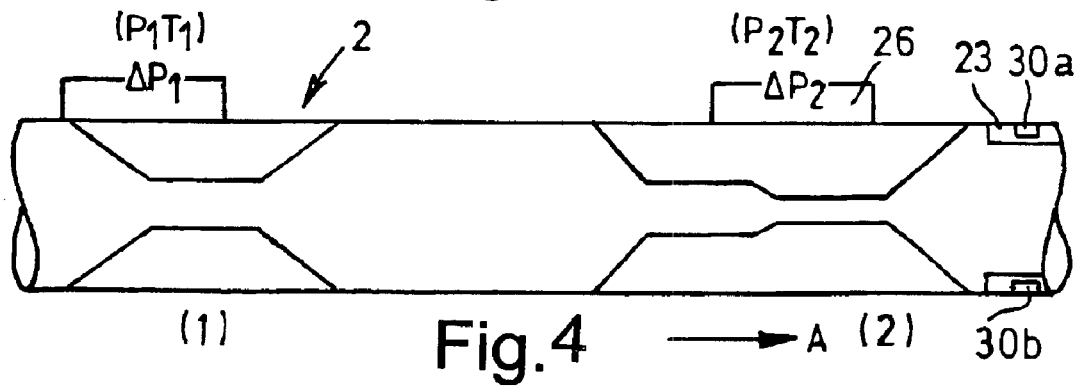
FIG. 4 is a diagrammatic view of a multi-phase flowmeter in accordance with a third embodiment of the present invention.

Reference is now made to FIG. 4 of the drawings which depicts a further alternative embodiment of the present invention. This embodiment is substantially identical to the embodiment shown in FIG. 2 except that the water fraction meter 23 is disposed downstream of the venturi 26. The same flow calculations apply but this arrangement is not preferred because gas in the multi-phase fluid will have expanded because of some pressure loss in the system.

Various modifications may be made to the flowmeters hereinbefore described without departing from the scope of the invention. Although all the flowmeters are shown as a compact structure in a single conduit, it will be appreciated by persons skilled in the art that the components could be disposed between widely spaced separate conduits, for example the venturis could be disposed in different tubular elements many meters or even hundreds of meters apart. The pressure drop device need not be a specific flow restriction component but could rely on the distance between venturis thus using the frictional pressure drop and gravity within the pipe.

The present invention has the principal advantage that radio-active measurement techniques are not used and the system is flexible enough to be installed in a single conduit or as dispersed components throughout a well. A further advantage is that no moving parts are required and the system takes advantage of some of the characteristics and sensors used in two-phase in-well measurement devices and extends these through the knowledge of phase behaviour or the phases to three-phase fluid systems which has hitherto not been achieved.

What is claimed is:

1. A multi-phase flowmeter for measuring the flow of a multi-phase fluid flowing through an in-well conduit, said flowmeter comprising:

a first pressure measuring means disposed in said conduit at a first location for measuring a first pressure differential at said first location;

a second pressure measuring means disposed in said conduit at a second location spaced along said conduit from said first pressure measuring means for measuring a second pressure differential at said second location;

pressure drop creation means for creating a measurable pressure drop, in use, between said first and second locations, and a water fraction measuring means for measuring the fraction of water in said multi-phase fluid, said water fraction meter being disposed at one of a first measurement location upstream of said first location and a second measurement location downstream of said second location.

2. A flowmeter as claimed in claim 1 wherein said first and said second pressure measuring means are venturi flowmeters.

3. A flowmeter as claimed in claim 1 wherein at least one of said first and said second pressure measuring means is a choke with at least two absolute pressure transducers for measuring the differential pressure across the choke.

4. A flowmeter as claimed in claim 1 wherein said pressure drop creation means is a third venturi disposed in said conduit at a third location between said first location and said second location.

5. A flowmeter as claimed in claim 4 wherein the second and third venturis are combined in a double venturi.

6. A flowmeter as claimed in claim 1 wherein said pressure drop creation means is a choke.

7. A flowmeter as claimed in claim 1 wherein the pressure drop creation means is a length of conduit providing a frictional pressure drop.

8. A flowmeter as claimed in claim 7 wherein the length of conduit is inclined to the horizontal to provide an additional pressure drop do to a gravity head.

9. A flowmeter as claimed in claim 1 wherein said multi-phase fluid includes an oil-continuous fluid and a water-continuous fluid and water fraction measuring means has a capacitance sensor for calculating a water fraction of said oil-continuous fluid flowing in said conduit and a conductance sensor for calculating the conductivity of said water-continuous fluid flowing in said conduit.

10. A flowmeter as claimed in claim 1 wherein said water fraction measuring means includes a microwave generator and detector for detecting the water fraction of fluid flowing in said conduit.

11. A flowmeter as claimed in claim 1 wherein the first and second venturi, the pressure drop creation means and the water fraction measuring means are disposed in a single tubular member.

12. A flowmeter as claimed in claim 1 wherein the first and the second venturi, the pressure drop creation means and the water fraction measuring means are disposed over a plurality of tubular members.

13. A method of measuring the flow rate of components of a multi-phase fluid flowing in an in-well conduit, said method comprising the steps of:

measuring a first pressure differential in said conduit at a first location;

measuring a second pressure differential in said conduit at a second location spaced from the first location;

creating a pressure drop in said multi-phase fluid between said first and said second locations and measuring the pressure drop;

measuring the fraction of water in said multi-phase fluid at one of a first measurement location upstream of said first location and a second measurement location downstream of said second location, and processing the first and second pressure differentials, the pressure drop and the water fraction measurements to provide a mass flow rate and a volume flow rate for each component of said multi-fluid at a flowing temperature and a pressure.

14. A method as claimed in claim 13 wherein the method includes the step of measuring the water fraction upstream of the first location.

* * * * *